(12) United States Patent
Heard, Jr.

(10) Patent No.: US 11,022,245 B2
(45) Date of Patent: Jun. 1, 2021

(54) PIPE HOT-TAPPING SYSTEM AND METHOD

(71) Applicant: James D. Heard, Jr., Cleveland, TX (US)

(72) Inventor: James D. Heard, Jr., Cleveland, TX (US)

( * ) Notice: Subject to any disclaimer, the term of this patent is extended or adjusted under 35 U.S.C. 154(b) by 0 days.

(21) Appl. No.: 16/737,304

(22) Filed: Jan. 8, 2020

(65) Prior Publication Data

US 2020/0284388 A1 Sep. 10, 2020

Related U.S. Application Data

(60) Provisional application No. 62/815,683, filed on Mar. 8, 2019.

(51) Int. Cl.
*F16L 41/06* (2006.01)

(52) U.S. Cl.
CPC ..................... *F16L 41/06* (2013.01)

(58) Field of Classification Search
CPC ........................................ F16L 41/06
USPC ........................................ 137/318
See application file for complete search history.

(56) References Cited

U.S. PATENT DOCUMENTS

| | | | | |
|---|---|---|---|---|
| 3,799,182 A | * | 3/1974 | Long | F16L 41/04 |
| | | | | 137/15.17 |
| 5,964,240 A | * | 10/1999 | Granovski | F16L 41/06 |
| | | | | 137/15.13 |
| 6,321,778 B1 | * | 11/2001 | Chen et al. | F16L 41/04 |
| | | | | 137/318 |
| 6,491,057 B1 | | 12/2002 | Collins | |
| 7,357,605 B2 | | 4/2008 | Weiler | |
| 7,552,742 B2 | | 6/2009 | Dole | |
| 2005/0247344 A1 | * | 11/2005 | Hombravella Abbad et al. | |
| | | | | B23B 51/0406 |
| | | | | 137/318 |
| 2007/0104547 A1 | | 5/2007 | Russell | |
| 2007/0113895 A1 | * | 5/2007 | Ishikawa et al. | F16L 47/345 |
| | | | | 137/318 |
| 2010/0126593 A1 | | 5/2010 | Silk | |
| 2015/0044013 A1 | | 2/2015 | Perkins | |

* cited by examiner

*Primary Examiner* — Kevin L Lee
(74) *Attorney, Agent, or Firm* — Boudwin Intellectual Property; Daniel Boudwin

(57) ABSTRACT

A system for reliable coupon retrieval when hot-tapping a fluid line, and a method of hot-tapping the fluid line using the system. The system includes an insertion member and a receiver, each configured to matingly engage with the other. The insertion member may be secured to a pipe carrying a fluid to be hot-tapped, and the receiver may be secured to a drill with a hole saw attached thereto. During use, as the drill approaches the insertion member, the insertion member enters the receiver and is secured in place by a securement mechanism. The hole saw cuts the piping, and the insertion member is detached from the pipe, with the coupon attached to the insertion member, to safely and reliably retrieve the coupon during the hot-tapping process.

12 Claims, 6 Drawing Sheets

PIPE HOT-TAPPING SYSTEM AND METHOD

CROSS REFERENCE TO RELATED APPLICATIONS

This application claims priority under 35 U.S.C. § 119(e) to U.S. Provisional Application No. 62/815,683 filed on Mar. 8, 2019. The above identified patent application is incorporated by reference herein in its entirety to provide continuity of disclosure.

BACKGROUND OF THE INVENTION

The present invention relates to a system and method for safely hot-tapping a pipe with a fluid therein.

Hot-tapping refers to the practice of cutting into a pipe having a live supply of a liquid therein, which may be necessary when branching or otherwise adding to a line of the pipe. If the hot-tapping goes as planned, the procedure provides a cost-effective solution that enables manufacturers and material suppliers to perform maintenance and construction on existing piping systems without shutting down plant operations. However, occasionally, the process does not go as planned due to escape of a coupon into a pipe. The coupon is the piece of pipe that is removed from a wall of the pipe, and when enters an interior of the pipe, damage to equipment or personnel may ensue. For example, the coupon could enter a pump, block a filter, or crash into an impeller, causing costly and dangerous damage to pipe systems. Injury or even death may occur as a result of these failures.

Existing solutions intended for capturing the coupon and preventing it from entering the interior of the pipe are unreliable, at least for their inability to consistently secure the coupon after the pipe is cut. They often include unreliable means for securing the coupon. These systems regularly fail, and the resulting risk of damage to pipe systems and personnel is unacceptable for the industry.

Therefore, there is a need for an improved hot-tapping system and method that enables reliable and predictable capture of the coupon during the hot-tapping process. The present invention addresses this unmet need.

Devices have been disclosed in the art that relate to coupon retrieval during hot tapping. These include devices that have been patented and published in patent application publications. These devices are often unreliable and undesirable by many in the industry. In view of the devices disclose e art, it is submitted that there is a need in the art for an improvement to existing coupon retrieval systems. In view of the present disclosure, it is submitted that the present invention substantially diverges in structural and functional elements from devices in the art, and substantially fulfills an unmet need in the art.

SUMMARY OF THE INVENTION

In view of the disadvantages inherent in the known types of coupon retrieval systems in the art, the present invention provides a new and improved system for retrieving a coupon during a hot-tapping process, wherein the same can be utilized for reliably retrieving the coupon when performing a hot-tapping method using the system.

It is therefore an object of the present invention to provide a pipe hot-tapping system for safely and reliably hot-tapping fluid lines.

In one aspect, the invention provides a system for coupon retrieve comprising a insertion member, which comprises a securement base on a proximal portion thereof and one or more flanges on a distal portion thereof, defining a body therebetween, and a receiver, which comprises a securement base on a proximal portion thereof and an aperture on a distal portion thereof, defining a cavity therebetween. The securement base of the insertion member is configured to be secured to a pipe to be hot-tapped, and the securement base of the receiver is configured to be secured to a drill. The aperture s sized to accept the body of the insertion member therethrough, and the cavity is configured to secure the body of the insertion member therein. Thus, the system provides a pair of components that matingly engage together and are secured once engaged to maintain hold on the insertion member, and therefore a coupon that results from a cutting operation of a hole saw of the drill, to reliably retrieve the coupon and prevent damage to piping systems or injury to personnel nearby.

In another aspect, the invention provides a method of hot-tapping a pipe that utilizes the system of the invention. In various embodiments, the method comprises securing a securement base of a insertion member to the pipe, wherein the securement base is positioned on a proximal portion of the insertion member, wherein the insertion member comprises one or more flanges on a distal portion thereof to define a body therebetween; securing a securement base of a receiver to a drill, wherein the securement base is positioned on a proximal portion of the receiver, wherein the receiver comprises an aperture on a distal portion thereof to define a cavity therebetween; inserting the insertion member through the aperture and into the cavity of the receiver; cutting a circular hole through the pipe using a hole saw attached to the drill. After the circular hole is cut through the pipe using the hole saw, the resulting coupon remains attached to the securement base of the insertion member, which is attached to the receiver and the drill to enable an operator to pull the coupon out by pulling the drill. In this manner, the coupon does not enter an interior of the pipe, and the risk of damage to systems and injury to personnel is reduced.

In various embodiments, the system further comprises a hole saw attached to the drill, wherein the receiver occupies a center of a space within the hole saw when attached to the drill. The receiver extends forward from the center of the space within the hole saw, and the hole saw itself surrounds or envelopes all or a portion of the receiver. In some embodiments, when the hole saw rotates in preparation for and during a cut of the pipe, the receiver rotates with it, and thus the receiver may rotate relative to the insertion member when the insertion member is positioned within the receiver.

In various embodiments, the insertion member, the aperture, and the cavity are each cylindrical. In this manner, a cylindrical design of these components ensures structural compatibility with each other, and may facilitate and simplify manufacturing of the system of the present invention.

In various embodiments, the insertion member includes two flanges on the distal portion thereof to form a mushroom head configured to be inserted through the aperture. The mushroom head may be comprised of a firm and/or sturdy material configured to be reliably secured within the receiver once inserted therein, and may be capable of withstanding substantial pulling forces without becoming removed or detached from the body of the insertion member. In this manner, during use, the system remains intact and the coupon may be safely retrieved.

In various embodiments, the cavity comprises a securement mechanism therein, wherein the securement mechanism secures the body of the insertion member therein. Generally, the securement mechanism may include any suitable structure for securing the insertion member within the receiver for reliable coupon retrieval. In this manner, the present disclosure contemplates a variety of structures or arrangements for the securement mechanism without necessarily falling outside the scope of the present invention.

In various embodiments, the securement mechanism is selected from a group that includes, but is not necessarily limited to, a plurality of tumblers, a plurality of split rings, and a sleeve with a plurality of punch-outs. The tumblers may be spring loaded, as described elsewhere herein, and in this manner may be biased toward a central position of the cavity of the receiver to hold the insertion member therein. The split rings may be slightly expandable upon entry of the insertion member into the receiver, and may return to their original diameter after the one or more flanges of the insertion member pass therethrough. The plurality of punch-outs may allow one-way (i.e., insertion) movement of the insertion member into the receiver, but disallow retrograde (i.e., removal) movement of the insertion member out of the receiver. In this manner, any of these suitable structures may be utilized in a particular embodiment for the securement mechanism.

In various embodiments, the tumblers of the plurality of tumblers are beveled. In such embodiments, a beveled surface of the tumblers ensures the one or more flanges are able to slidably displace the tumblers into a plurality of tumbler cavities, against the biases of the springs of the tumblers. In this manner, upon entry of the insertion member into the receiver, the insertion member does not engage the sides of the tumblers and stop upon such engagement.

In various embodiments, the system further comprises a plurality of beveled tumblers within the cavity, wherein the beveled tumblers of the plurality of beveled tumblers are spring-biased toward a center of the cavity. In such embodiments, the insertion member can effectively insert into the cavity of the receiver for securement therein.

In various embodiments, upon insertion of the insertion member through the aperture and into the cavity, the biases of the springs of the beveled tumblers are overcome to cause the beveled tumblers to retract and allow the one or more flanges of the insertion member to pass therethrough. In such embodiments, after the one or more flanges pass by the beveled tumblers, the beveled tumblers are sprung back into place to lock the insertion member within the receiver. In this and similar configurations, when the insertion member is locked to the receiver, the system is prepared for a circular cut to be performed by the hole saw attached to the drill.

In various embodiments, when the one or more flanges of the insertion member pass by the beveled tumblers, the beveled tumblers spring back into place to secure the body of the insertion member within the cavity. In this manner, the insertion member does not slip or fall out of the receiver, which could cause loss of the coupon.

Another object of the present invention is to provide a system for coupon retrieval that may be readily manufactured from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of the invention will be particularly pointed out in the claims, the invention itself and manners in which it may be made and used may be better understood after a review of the following description, taken in connection with the accompanying drawings, wherein like numeral annotations are provided throughout.

DETAILED DESCRIPTION OF THE INVENTION

Figure 1:
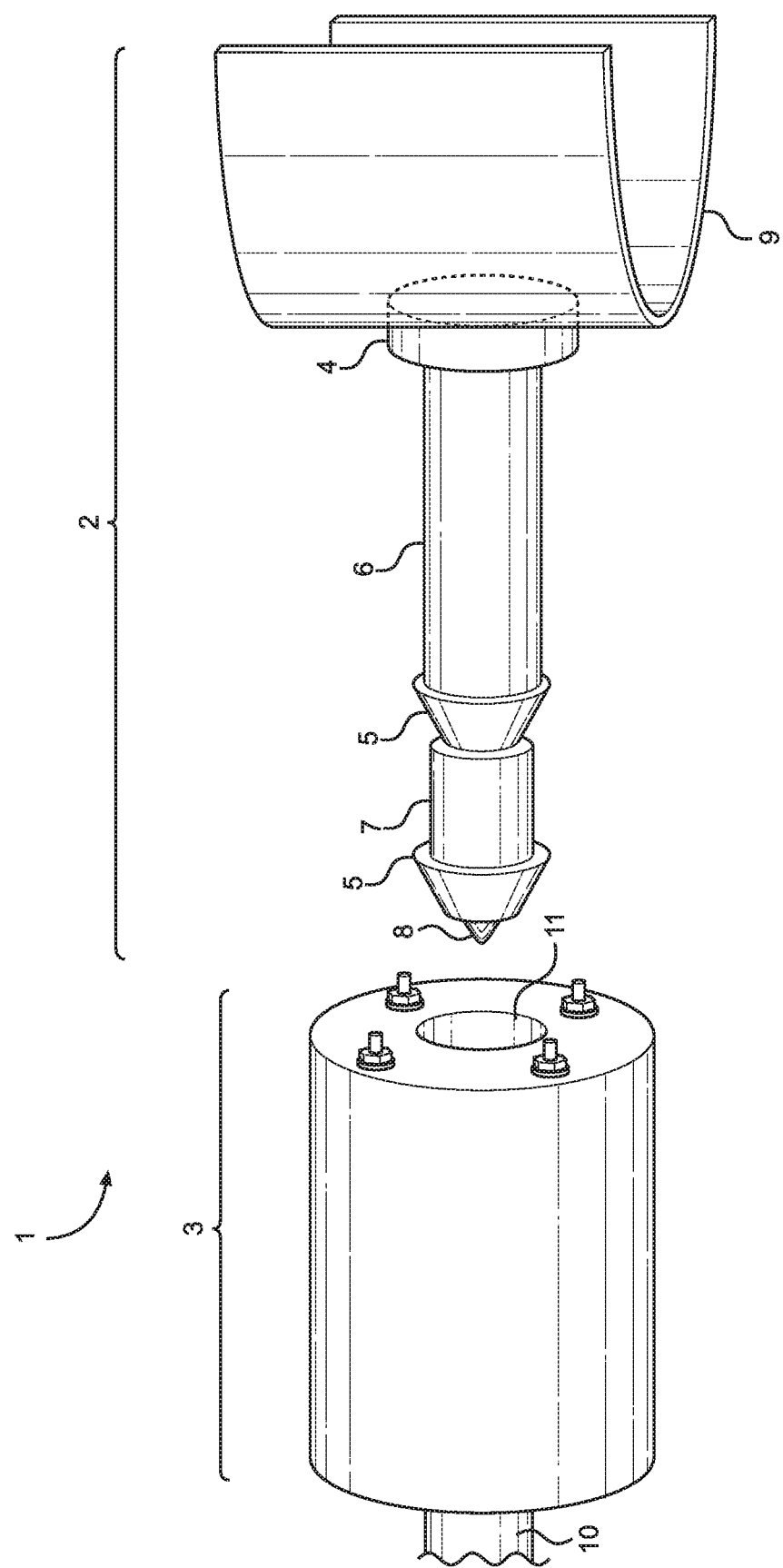
FIG. 1 depicts a perspective view of an exemplary pipe hot-tapping system, according to the present invention.

Reference is made herein to the attached drawings. Like reference numerals are used throughout the drawings to depict like or similar elements of the invention. The figures are intended for representative purposes only and should not be considered limiting in any respect.

Reference is now made to the drawings, which depict one or more exemplary embodiments of the invention.

Referring now to FIG. 1, there is depicted a perspective view of an exemplary pipe hot-tapping system, according to the present invention. A pipe hot tapping system for coupon retrieval 1 includes an insertion member 2 and a receiver 3. The insertion member 2 is comprised of a securement base 4 on a proximal portion thereof and one or more flanges 5 on a distal portion thereof, defining a body 6 therebetween. The receiver 3 is comprised of a securement base 10 on a proximal portion thereof and an aperture 11 on a distal portion thereof, defining a cavity therebetween. In the shown embodiment, the insertion member 2 further comprises a head portion 7 positioned between two flanges 5, and a tip portion 8 on a distal-most portion of the insertion member 2. In addition, in the shown embodiment, the insertion member 2 is connected to a saddle 9, which is configured to wrap around a portion of a pipe to be cut.

To prepare the system for use, the saddle 9 is attached, e.g., welded, to a pipe, such as a metal pipe, to be cut. The insertion member 2 is then attached, e.g., welded, to the saddle 9 to secure the insertion member 2 to the pipe. Then, the receiver 3 is attached to a drill by the securement base 10 thereof, and the insertion member 2 is inserted into the receiver 3. After inserting the insertion member into the receiver 3, a hole saw of the drill is used to cut a hole in the pipe to perform the hot tap and retrieve the coupon, as described elsewhere herein.

Figure 2C:
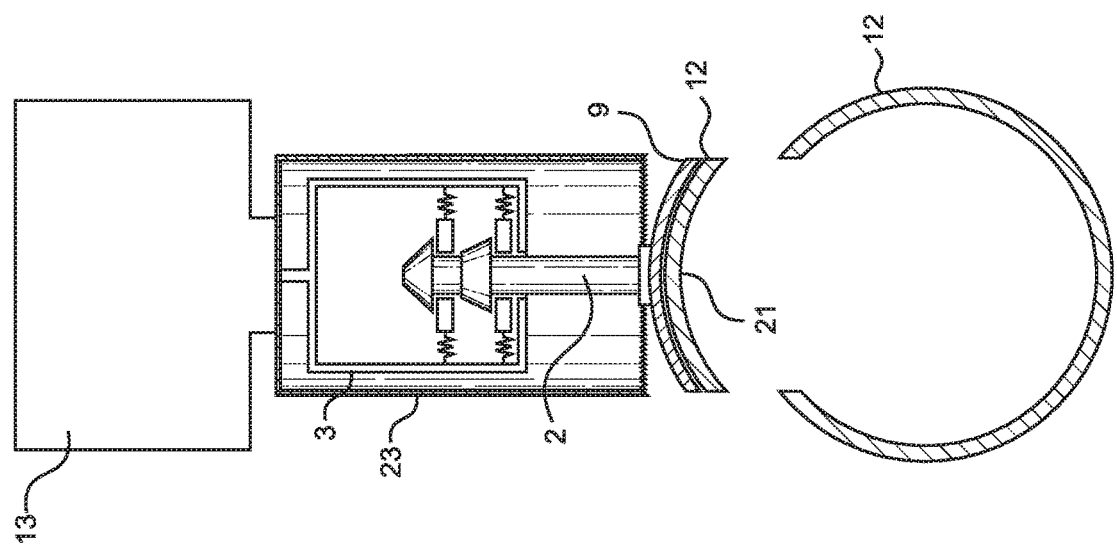
FIG. 2C depicts a cross sectional view of the exemplary pipe hot-tapping system, after removal of the system from the pipe and successful retrieval of a coupon of the pipe.
Figure 2B:
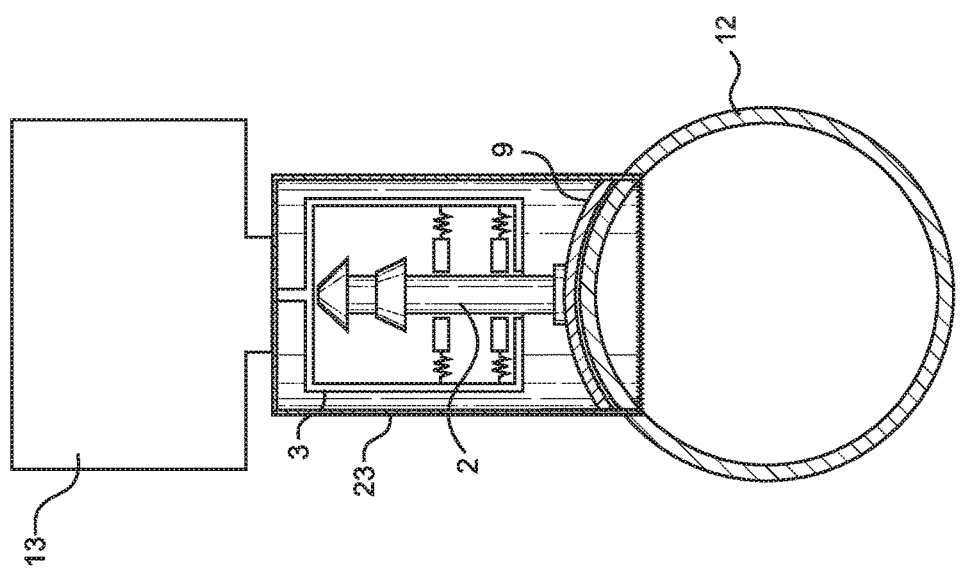
FIG. 2B depicts a cross sectional view of the exemplary pipe hot-tapping system, with a hole saw cutting into the pipe.
Figure 2A:
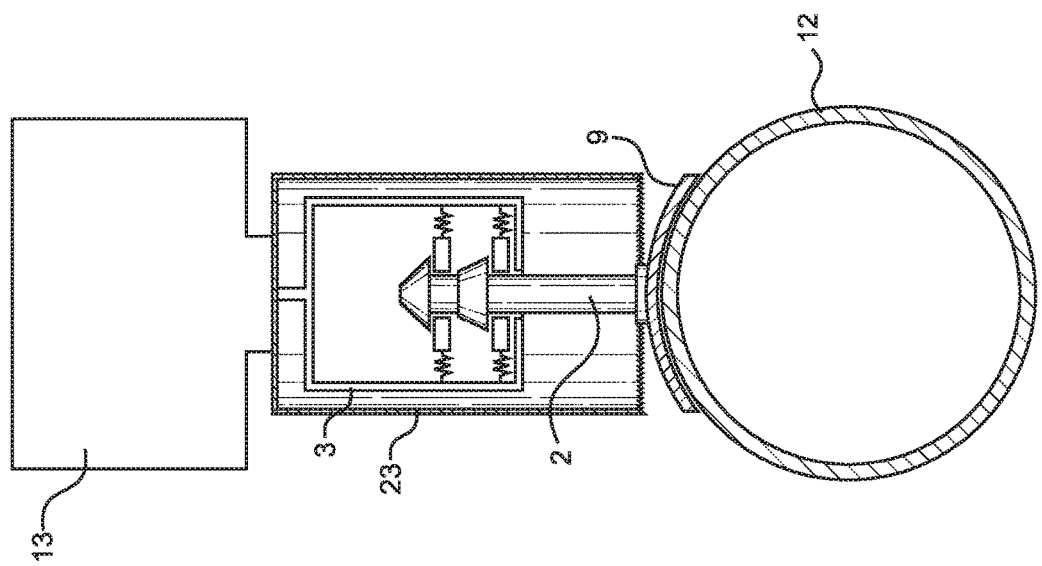
FIG. 2A depicts a cross sectional view of the exemplary pipe hot-tapping system, with an insertion member inserted into a receiver and the system prepared to cut a pipe.

Referring now to FIGS. 2A-2C, there are depicted several cross sectional views of the exemplary pipe hot-tapping system, before (FIG. 2A), during (FIG. 2B) and after (FIG. 2C) a cut is performed by a hole saw attached to a drill. In the shown embodiment, the insertion member 2 is attached to the saddle 9 which is in turn attached to the pipe 12. To utilize the exemplary system, the insertion member 2 is inserted into the receiver 3 which is connected to a drill 13, as shown in FIG. 2A, with a hole saw 23 positioned around the receiver 3. The drill 13 is moved toward the pipe 12, which causes the insertion member 2 to be further inserted within the receiver 3, and which also causes the hole saw 23 around the saddle and to contact the pipe 12, cutting into the pipe 12. After the cut is made, the system is withdrawn from the pipe to produce a coupon 21 which is a portion of the pipe 12, and which remains connected to the portion of the saddle 9 that was cut out by the hole saw 23 (FIG. 2C). The saddle 9 remains connected to the insertion member 2, which in turn remains secured within the receiver 3, in the shown embodiment by way of spring-biased tumblers. In this manner, the coupon 21 is safely and reliably retrieved from the pipe 12 after the cut is made.

In some embodiments, the system is designed to be fitted as a drill attachment to a standard drill 13, or to an industrial drill 13 configured for the purpose of hot-tapping piping systems. In such embodiments, the hole saw 23 rotates along with the receiver 3, and as a result, the interaction between the receiver 3 and the insertion member 2 may be such that a rotational movement is allowed, but substantial or extended forward or rearward motion is limited to a length of the cavity of the receiver 3. In such embodiments, the insertion member 2, the aperture of the receiver, and the cavity of the receiver are each cylindrical. In this manner, the rotational movement of the receiver 3 with respect to the insertion member 2 is allowed.

Figure 3A:
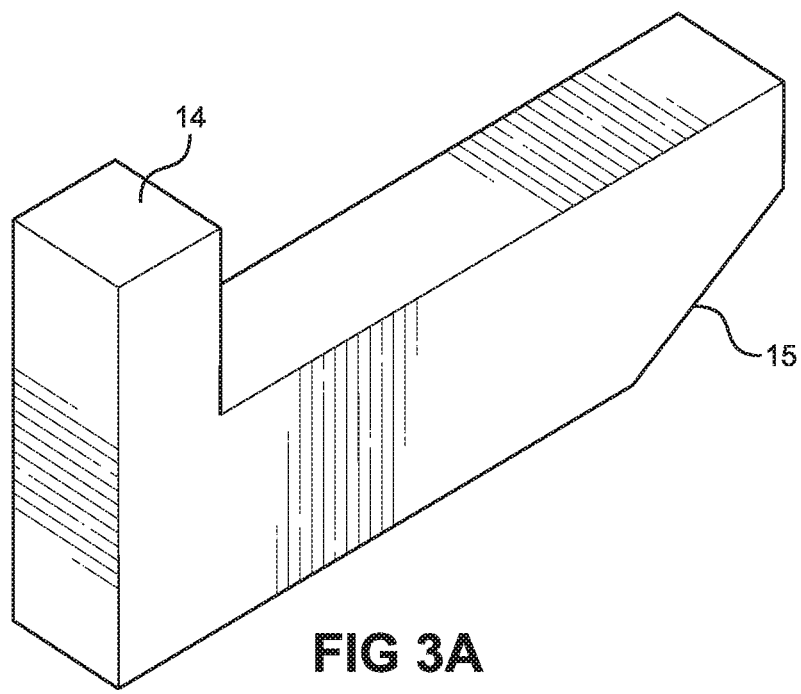
FIG. 3A depicts a perspective view of an exemplary tumbler of an exemplary receiver.
Figure 3B:
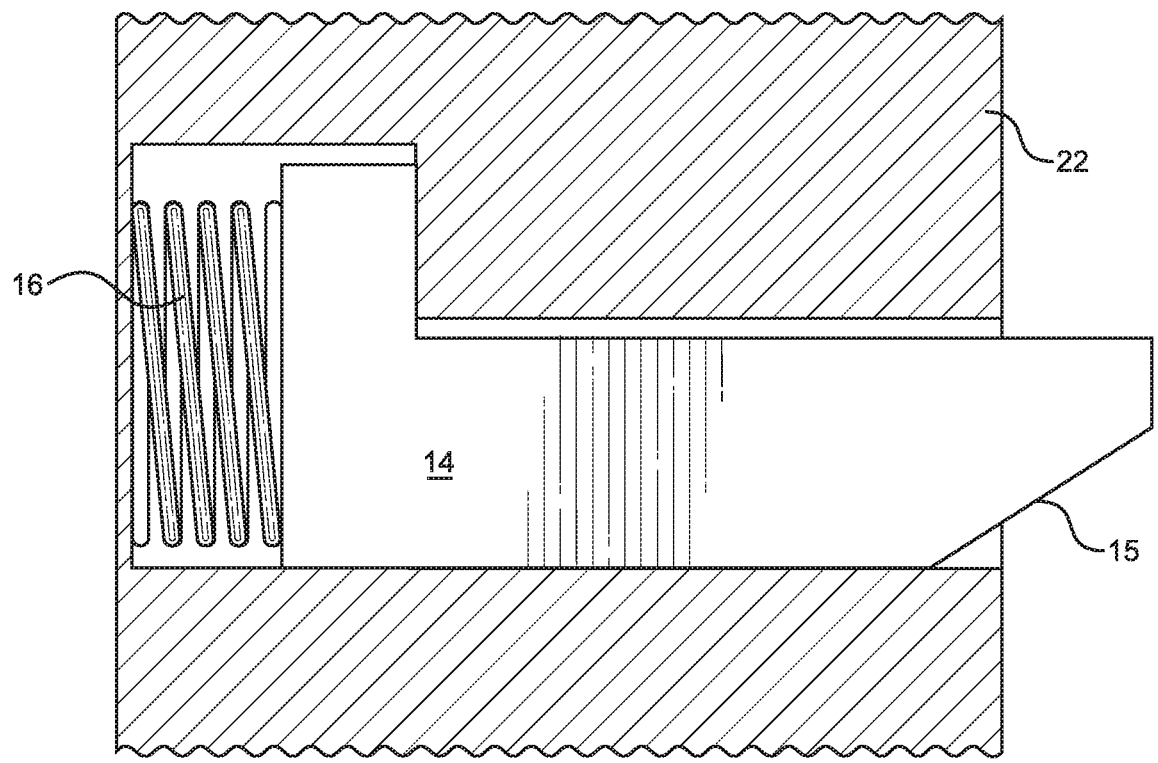
FIG. 3B depicts a cross-sectional view of the exemplary tumbler, spring-biased within a tumbler channel.
Figure 3C:
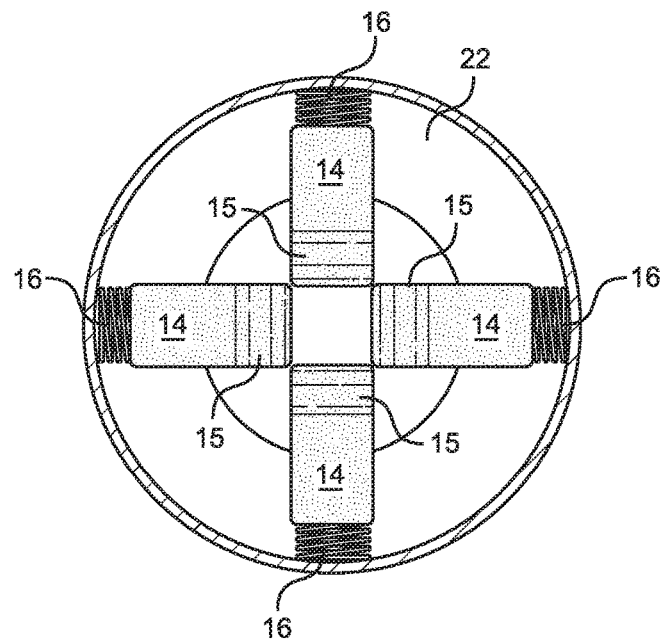
FIG. 3C depicts a cross-sectional view of a plurality of exemplary tumblers positioned within the exemplary receiver.
Figure 3D:
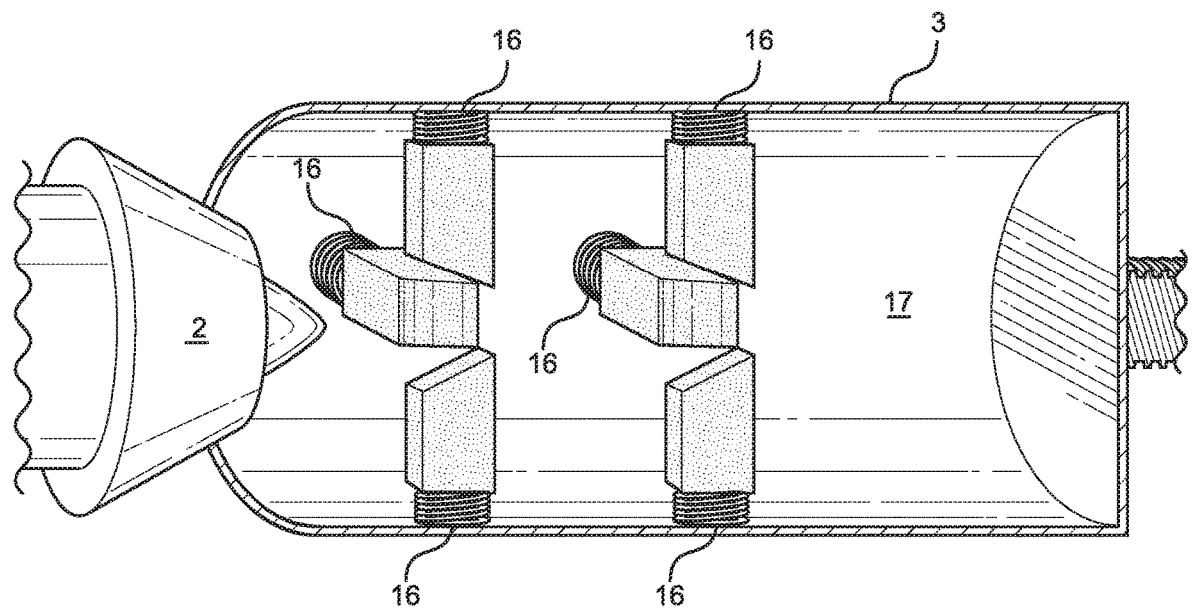
FIG. 3D depicts a cutout view of the exemplary receiver with spring-biased tumblers, with an insertion member adjacent thereto.

Referring now to FIGS. 3A-3D, there are depicted several views of an embodiment of the receiver that utilizes spring-biased beveled tumblers to receive and secure the insertion member within the cavity of the receiver. A spring-biased beveled tumbler 14 includes a bevel 15 thereon, configured to slidingly accept a movement of the insertion member 2 within the cavity of the receiver. The spring-biased beveled tumbler 14 (FIG. 3A) fits within a channel of a sidewall 22, as shown in FIG. 3B and FIG. 3C (sidewall 22 omitted in FIG. 3D for clarity), with a portion of the bevel 15 exposed in a cavity 17 of the receiver, and with a spring 16 biasing the spring-biased beveled tumbler 14 toward a center of the cavity 17 of the receiver. In this manner, a force of the spring 16 ensures the spring-biased beveled tumbler is locked back into place after the one or more flanges of the insertion member 2 pass thereby, to hold and secure the insertion member 2 in the receiver 3.

It is contemplated that the system of the present invention may be single-use, such that the insertion member 2 and the receiver 3 are discarded after use in a single hot-tapping procedure. In certain controlled-risk scenarios this may be advantageous, at least because design of the present system may be made to ensure successful capture of the coupon during use, without consideration to cost of replacing the insertion member 2 and the receiver 3. This is because a cost of damage to a piping system that results from a lost coupon may exceed the cost of replacing the system after every use. However, in some embodiments, the system may be reusable so as to preserve the components of the system for later uses. Generally, it is intended and contemplated that the components of the system be rugged and reliable so that they operate when under substantial forces or stresses so as to reliably and effectively retrieve the coupon.

Figure 4A:
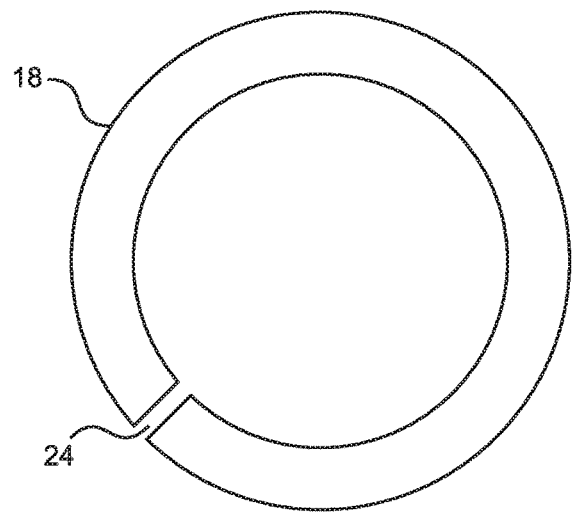
FIG. 4A depicts a front view of an exemplary split ring.
Figure 4B:
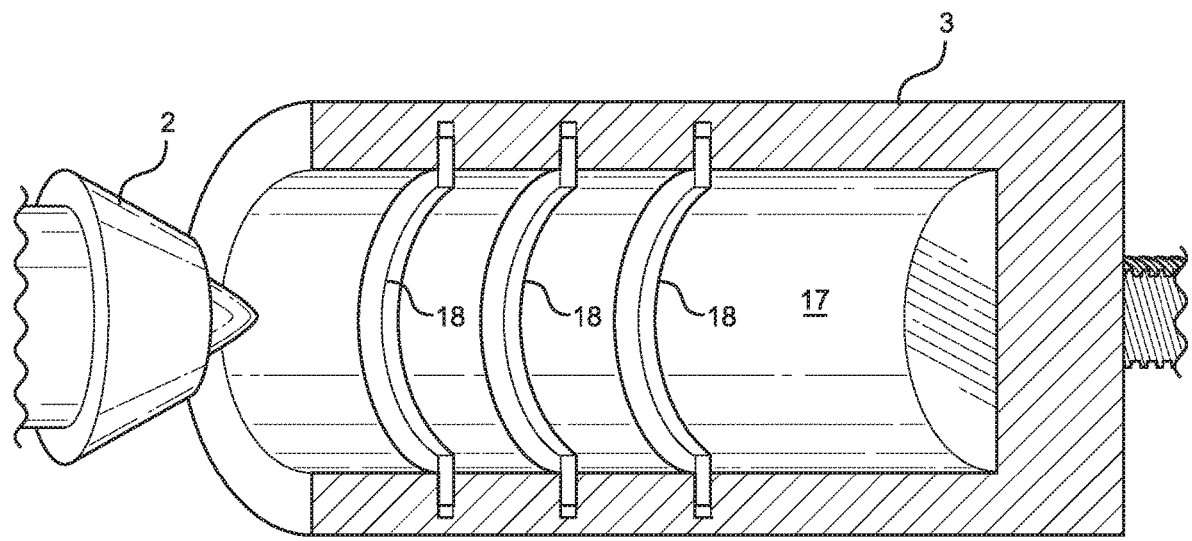
FIG. 4B depicts a cutout view of an alternate embodiment of a receiver of the present invention, with a plurality of split rings within a cavity of the receiver.

Referring now to FIGS. 4A and 4B, there are depicted a front view of an exemplary split ring (FIG. 4A) and a cutout view of an alternate embodiment of a receiver of the present invention, with a plurality of split rings within a cavity of the receiver (FIG. 4B). In the shown embodiment, a split ring 18 includes a gap 24 thereon, such that the split ring 18 can expand and contract slightly. In this manner, a plurality of split rings 18 may be fitted within grooves of the receiver 3, and used to hold and secure the insertion member 2 within the cavity 17 of the receiver 3. In such embodiments, the split rings 18 expand as the insertion member 2 passes therethrough, and contract after the insertion member 2 has passed therethrough.

Figure 5A:
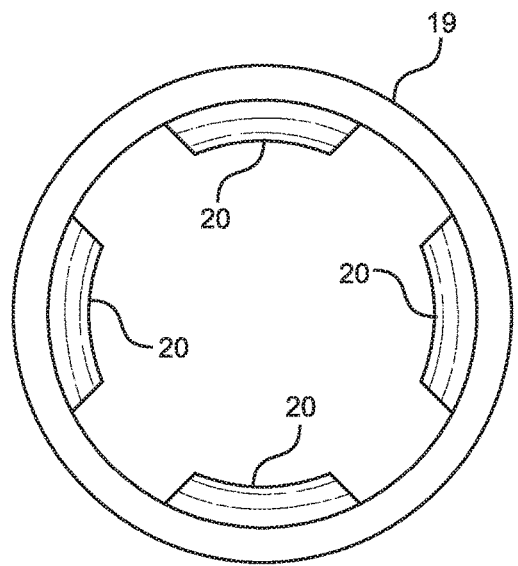
FIG. 5A depicts a front view of an example section of an alternate embodiment of a receiver of the present invention, with a sleeve having a plurality of punchouts.
Figure 5B:
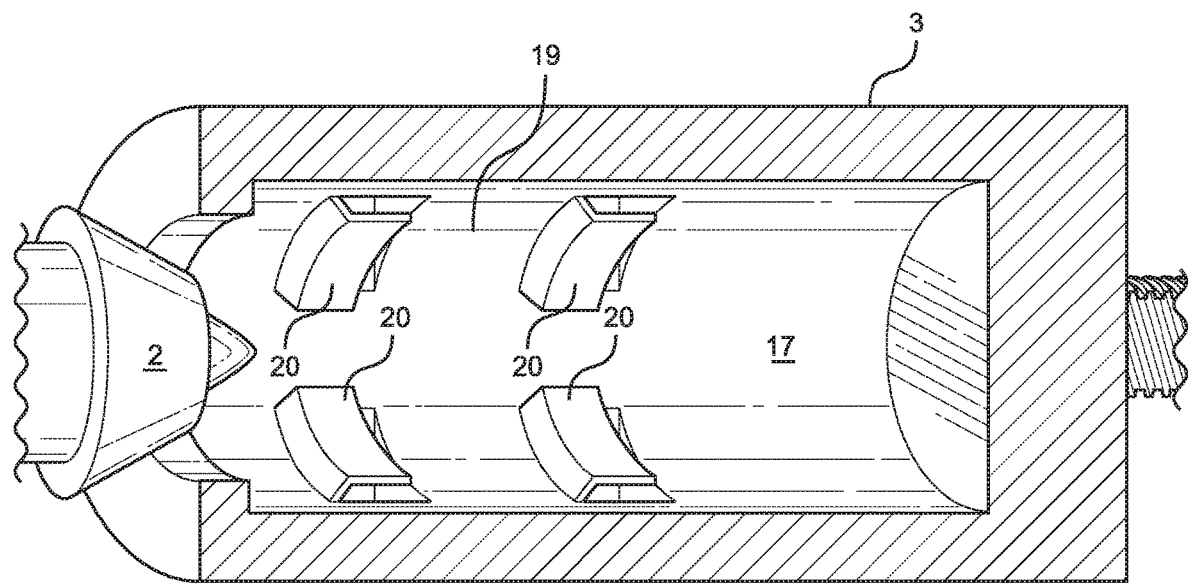
FIG. 5B depicts a cutout view of the alternate embodiment of the receiver, with the sleeve having the plurality of punchouts.

Referring now to FIGS. 5A and 5B, there are depicted a front view of an example section of an alternate embodiment of a receiver of the present invention, with a sleeve having a plurality of punchouts (FIG. 5A) and a cutout view of the alternate embodiment of the receiver with the punchouts (FIG. 5B). The punchouts 20 of the plurality of punchouts include a sloped rear surface configured to allow the insertion member 2 to pass thereby, and a forward lip configured to secure the insertion member 2 within the cavity 17 of the receiver 3. In the shown embodiment, the punchouts 20 are made as part of a sleeve 19 that is within the receiver 3. In addition, the punchouts 20 may be slightly flexible, and in this manner, be configured to allow the insertion member 2 to pass thereby.

Generally, any one or more of the securement mechanisms disclosed herein, such as the spring-biased beveled tumblers, the split ring, and the punchout, may be combined and utilized in a particular embodiment. For example, if it is found that the spring-biased beveled tumbler is most effective as a first securement mechanism, and a punchout is most effective as a second securement mechanism, these two could be combined in a hybrid design. In this manner, the present disclosure is not necessarily limited to the specific structures exemplified by the figures or described herein.

In the exemplary embodiments shown and described herein, the insertion member is attached to the pipe, and the receiver is attached to the drill. However, it is expressly contemplated that these structures be reversed, and that the receiver may alternatively be attached to the pipe, and the male member attached to the drill, according to some embodiments of the present invention. The male-female nature of the mating engagement between the insertion member and the receiver can be arranged according to any particular need, application, or design. In this manner, the present invention envisions and encompasses any and all such variations in design, including but not limited to assignment of the drill attachment as male or female, and assignment of the piping attachment as female or male, respectively.

The foregoing descriptions of specific embodiments of the present invention have been presented for purposes of illustration and description. They are not intended to be exhaustive or limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the present invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

I claim:

1. A system for coupon retrieval, comprising:
   an insertion member, comprising a securement base on a proximal portion thereof and one or more flanges on a distal portion thereof, defining a body therebetween;
   a receiver, comprising a securement base on a proximal portion thereof and an aperture on a distal portion thereof, defining a cavity therebetween;
   wherein the aperture is sized to accept the body of the insertion member therethrough, and wherein the cavity is configured to secure the body of the insertion member therein;
   wherein the securement base of the insertion member is configured to be secured to a pipe to be hot-tapped;
   wherein the securement base of the receiver is configured to be secured to a drill.

2. The system of claim 1, further comprising a hole saw attached to the drill, wherein the receiver occupies a center of a space within the hole saw when attached to the drill.

3. The system of claim 1, wherein the insertion member includes two flanges on the distal portion thereof to form a mushroom head configured to be inserted through the aperture.

4. The system of claim 1, wherein the cavity comprises a securement mechanism therein, wherein the securement mechanism secures the body of the insertion member therein.

5. The system of claim 4, wherein the securement mechanism is selected from a group consisting of: a plurality of tumblers, a plurality of split rings, and a plurality of punch-outs.

6. The system of claim 5, wherein the tumblers of the plurality of tumblers are beveled.

7. The system of claim 1, further comprising a plurality of beveled tumblers within the cavity, wherein the beveled tumblers of the plurality of beveled tumblers are spring-biased toward a center of the cavity.

8. The system of claim 7, whereupon insertion of the insertion member through the aperture and into the cavity, the biases of the springs of the beveled tumblers are overcome to cause the beveled tumblers to retract and allow the one or more flanges of the insertion member to pass therethrough; whereupon the one or more flanges of the insertion member pass by the beveled tumblers, the beveled tumblers spring back into place to secure the body of the insertion member within the cavity.

9. A method of hot-tapping a pipe, comprising:
   securing a securement base of an insertion member to the pipe, wherein the securement base is positioned on a proximal portion of the insertion member, wherein the insertion member comprises one or more flanges on a distal portion thereof to define a body therebetween;
   securing a securement base of a receiver to a drill, wherein the securement base is positioned on a proximal portion of the receiver, wherein the receiver comprises an aperture on a distal portion thereof to define a cavity therebetween, wherein the cavity comprises a securement mechanism therein, wherein the securement mechanism secures the body of the insertion member therein, wherein the securement mechanism is selected from a group consisting of: a plurality of tumblers, a plurality of split rings, and a sleeve with a plurality of punch-outs;
   inserting the insertion member through the aperture and into the cavity of the receiver;
   cutting a circular hole through the pipe using a hole saw attached to the drill.

10. The method of claim 9, further comprising retrieving a coupon of the pipe formed by the cutting of the circular hole.

11. The method of claim 9, wherein the tumblers of the plurality of tumblers are beveled.

12. A system for coupon retrieval, comprising:
    an insertion member, comprising a securement base on a proximal portion thereof and one or more flanges on a distal portion thereof, defining a body therebetween;
    a receiver, comprising a securement base on a proximal portion thereof and an aperture on a distal portion thereof, defining a cavity therebetween;
    wherein the aperture is sized to accept the body of the insertion member therethrough, and wherein the cavity is configured to secure the body of the insertion member therein;
    wherein the cavity comprises a securement mechanism therein, wherein the securement mechanism secures the body of the insertion member therein.

* * * * *